United States Patent [19]

Belter

[11] Patent Number: 4,746,023
[45] Date of Patent: May 24, 1988

[54] PUNCTURABLE OIL SEAL

[75] Inventor: Jerome G. Belter, Mt. Prospect, Ill.

[73] Assignee: Dana Corporation, Toledo, Ohio

[21] Appl. No.: 78,981

[22] Filed: Jul. 29, 1987

[51] Int. Cl.⁴ .............................................. F16J 15/10
[52] U.S. Cl. ....................... 277/237 R; 277/DIG. 10; 123/198 E
[58] Field of Search ................... 277/1, 237, DIG. 10, 277/12, 32; 123/198 E

[56] References Cited

U.S. PATENT DOCUMENTS

| | | |
|---|---|---|
| 843,516 | 2/1907 | Caprini . |
| 864,740 | 8/1907 | Hildenbrand . |
| 2,410,143 | 10/1946 | Altman .................. 123/198 E X |
| 3,235,274 | 2/1966 | Cain et al. ................ 277/DIG. 10 |
| 3,567,061 | 3/1971 | Song . |
| 3,721,452 | 3/1973 | Black . |
| 3,848,074 | 11/1974 | Channell ............. 277/DIG. 10 X |
| 4,079,193 | 3/1978 | Channell ............. 277/DIG. 10 X |
| 4,454,632 | 6/1984 | Nix et al. . |
| 4,508,072 | 4/1985 | Takami et al. ........... 123/198 E X |
| 4,600,127 | 7/1986 | Malpas et al. . |
| 4,601,959 | 7/1986 | Romero . |
| 4,602,504 | 7/1986 | Barber . |

FOREIGN PATENT DOCUMENTS 0177186  4/1986  European Pat. Off. .... 277/DIG. 10

Primary Examiner—Robert S. Ward
Attorney, Agent, or Firm—Marshall & Melhorn

[57] ABSTRACT

A puncturable seal assembly is formed with a tubular shell adapted to be retained in an aperture in a housing of a vehicle engine. A generally radially inwardly extending flange is formed at one end of the tubular shell to define an opening which is closed by a sealing membrane. The sealing membrane has a generally circular center section attached to an annular rim portion which is molded about and bonded to the flange. A plurality of grooves are formed in a surface of the central portion whereby when pressure is applied to the membrane, the grooves rupture before any other portion of the membrane thereby permitting insertion of an oil line tube into the aperture in the housing of a vehicle engine.

20 Claims, 2 Drawing Sheets

PUNCTURABLE OIL SEAL

BACKGROUND OF THE INVENTION

The invention relates generally to seals for fluid reservoirs and, particularly, to a puncturable oil seal for temporarily sealing an oil line connection aperture in a vehicle engine.

During the initial building, testing and shipping of vehicle engines, the installation of several accessories and external elements is delayed. For example, it is desirable to delay the installation of external oil line tubing to prevent damage to such tubing during the handling of the vehicle engine prior to installation in the vehicle. In other instances, the oil line is not installed until it is to be connected to another part on the vehicle such as an oil cooler. Since oil is typically added to the engine in order to test the operation of the engine, some form of plug must utilized to close the opening into which the tubing will later be installed. Thus, the plug must be installed and then later removed when the tubing is to be installed. Such an operation increases the cost of producing the engine.

SUMMARY OF THE INVENTION

The invention concerns a puncturable seal assembly for an external oil line aperture in a vehicle engine. The seal assembly includes an elastomeric diaphragm or membrane which is molded to a metallic casing. The diaphragm is formed with a plurality of scored grooves which define a predetermined puncture pattern. The seal assembly is press fitted into the oil line aperture to seal against the loss of oil during the initial building, testing and shipping of the engine. When the external oil line is to be connected to the engine, an end of the oil line tubing is inserted into the seal assembly thereby puncturing the diaphragm.

DETAILED DESCRIPTION OF THE PREFERRED EMBODIMENTS

Figure 1:
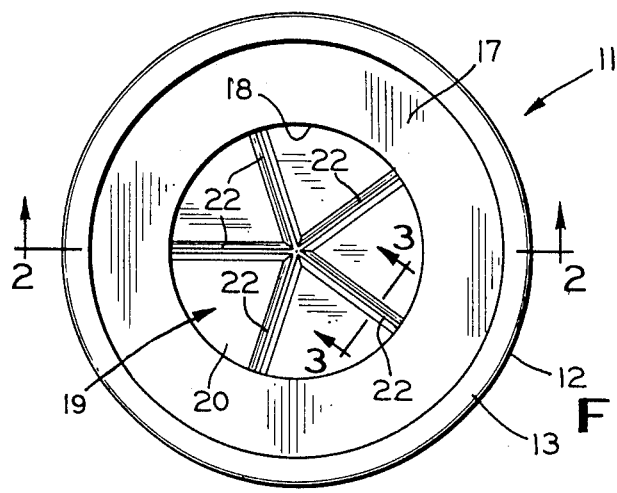
FIG. 1 is a top plan view of a puncturable oil seal in accordance with the present invention.
Figure 3:
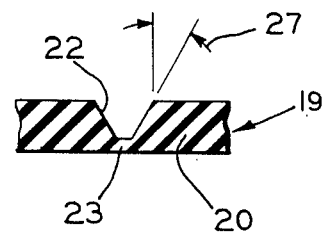
FIG. 3 is a fragmentary cross-sectional view taken along the line 3—3 in FIG. 1.
Figure 2:
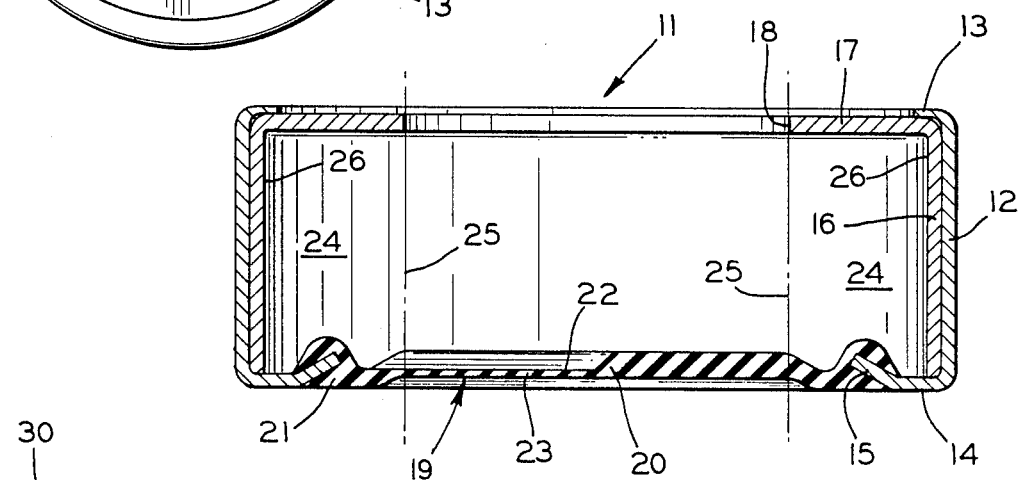
FIG. 2 is a cross-sectional view taken along the line 2—2 in FIG. 1.

Referring to FIGS. 1-3, there is shown a puncturable oil seal assembly 11 constructed in accordance with the present invention. The assembly 11 includes a tubular outer shell 12 having a generally radially inwardly extending upper flange 13 formed at an upper end thereof and a generally radially inwardly extending lower flange 14 formed at a lower end thereof. An inner periphery 15 of the lower flange 14 is angled upwardly and inwardly.

A tubular inner shell 16 is retained between the flanges 13 and 14 and has a generally radially inwardly extending upper flange 17 formed at an upper end thereof abutting the upper flange 13 of the tubular outer shell 12. An inner peripheral edge 18 of the flange 17 defines a aperture which is dimensioned to receive an oil line tube typically in a press or close fit relationship. The shells 12 and 16 are formed of a metallic material with the inner shell 16 being inserted into the outer shell 12 before the upper flange 13 is formed.

Bonded to the outer shell 12 at the periphery 15 of the lower flange 14 is a generally circular sealing membrane or seal 19. The seal 19 includes a generally circular central portion 20 surrounded on its peripheral edge by a rim portion 21 which is molded around and bonded to the periphery 15 of the lower flange 14. Thus, the seal 19 completely closes the opening defined by the periphery 15. A plurality of grooves 22 are formed in the upwardly facing surface of the central portion 20. The grooves 22 extend radially outwardly from the center of the central portion 20 to the rim portion 21. At the bottom of each groove 22 is a reduced thickness wall 23 which tends to rupture when force is applied with the end of an oil tubing line. The seal 19 can be formed of a suitable elastomeric compound such as a nitrile, silicone, or fluoroelastomer rubber material having a durometer of approximately seventy.

In operation, the seal assembly 11 is press fitted into an aperture in, for example, the block portion of a vehicle engine before the crankcase of the engine has been filled with oil. The aperture defined by the peripheral edge 18 faces inwardly such that the downwardly facing surface of the seal 19 faces outwardly and the seal assembly 11 closes the aperture in the engine. The seal assembly 11 prevents the oil from escaping from inside the engine during the initial building, testing and shipping of the engine. When it is desired to install the oil line tubing, an end of the tubing is pressed into contact with the lower outwardly facing surface of the central portion 20. As pressure is applied to the oil line tubing, the grooves 22 rupture and the areas of the central portion 20 of the seal 19 tend to bend away from the end of the oil line as it is extended through the bottom of the seal assembly 11. A space 24 defined between an outer wall 25 of the oil line (shown in phantom) and an inner wall 26 of the tubular inner shell 16 is available to receive the sections of the central portion 20 which bend inwardly or other pieces which might tend to break away and otherwise might enter the open end of the oil line tube. As can be seen in FIG. 2, the outer ends of the grooves 22 extend radially outwardly beyond the inner peripheral edge 18 of the upper flange 17.

As shown in FIG. 3, the side walls of the grooves 22 are formed with at an approximately thirty degree angle 27 with respect to the vertical. However, it will be appreciated that the angle 27, the thickness of the wall 23 and the number of the grooves can be varied without departing from the scope of the invention.

Figure 4:
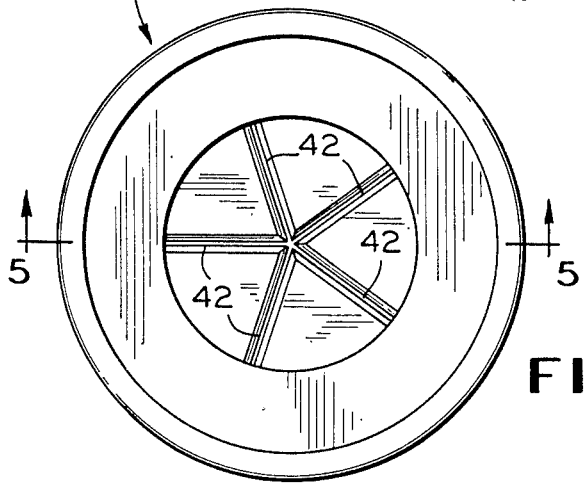
FIG. 4 is plan view of a first alternate embodiment oil seal according to the present invention.
Figure 5:
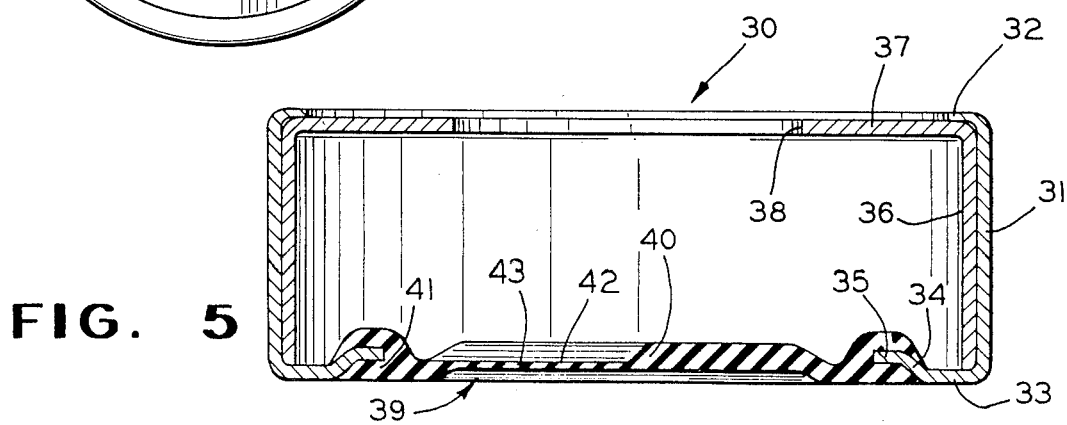
FIG. 5 is a cross-sectional view taken along the 5—5 in FIG. 4.

There is shown in FIGS. 4 and 5, a first alternate embodiment puncturable oil seal 30. The seal assembly 30 includes a tubular outer shell 31 having an upper flange 32 and a lower flange 33. Extending generally radially inwardly and upwardly from the lower flange 33 is an intermediate portion 34. Extending radially inwardly from the intermediate portion 34 is peripheral portion 35 defining a lower aperture in the seal assembly 30. Retained between the upper flange 32 and the lower flange 33 is a tubular inner shell 36 having a radially inwardly extending upper flange 37 terminating in an inner peripheral edge 38 forming an opening for an oil line tube.

The lower aperture defined by the peripheral portion 35 is closed by a seal 39 having a generally circular central portion 40 terminating in a rim portion 41 which is molded about and bonded to the peripheral portion 35 in the intermediate flange portion 34 of the tubular outer shell 31. A plurality of grooves 42 are formed in the upwardly facing surface of the central portion 40 of the seal 39. The bottoms of the grooves 42 are defined by a reduced thickness wall 43 which represents a rupturable portion of the seal 39.

Figure 6:
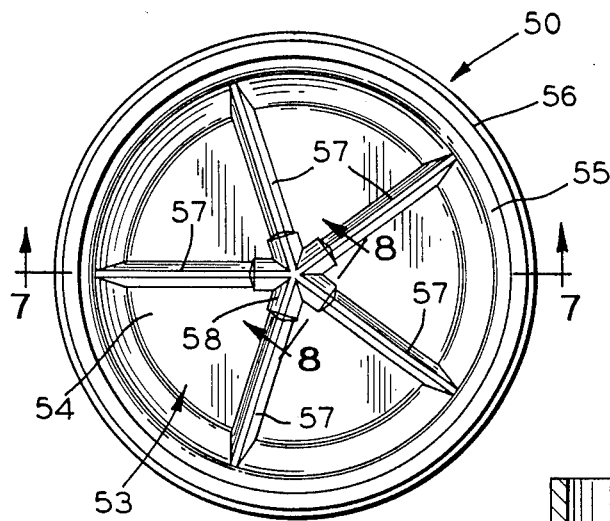
FIG. 6 is a plan view of a second alternate embodiment oil seal according to the present invention.
Figure 8:
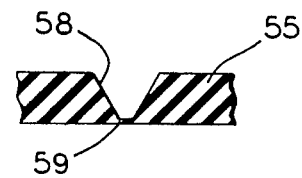
FIG. 8 is a fragmentary cross-sectional view taken along the line 8—8 in FIG. 6.
Figure 7:
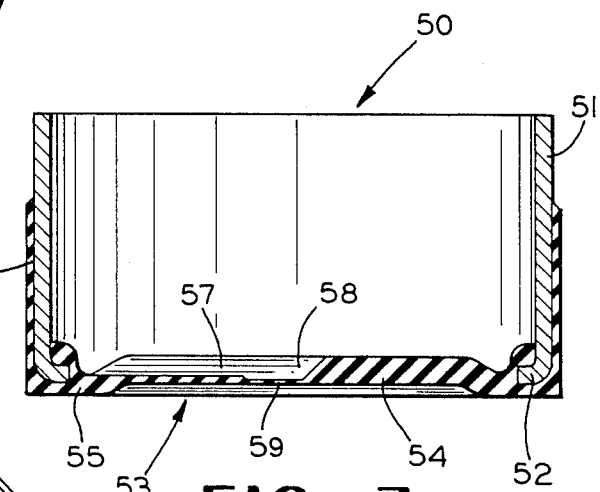
FIG. 7 is a cross-sectional view taken along the line 7—7 in FIG. 6.

Typically, the thickness of the central portions 20 and 40 is in the range of 0.81–0.97 millimeters and the thickness of the reduced thickness walls 23 and 43 is in the range of 0.20 to 0.31 millimeters. In some instances, however, such as when the seal assembly is of a relatively small diameter, for example, approximately 17.45 millimeters, the center of the central portion can be formed with an even thinner wall. Referring to FIGS. 6–8, a second alternate embodiment puncturable oil seal assembly 50 is shown having a tubular shell 51 with a generally radially inwardly extending lower flange 52 formed at a lower end thereof. The aperture defined by the inner peripheral edge of the lower flange 52 is closed by a seal 53 having a generally circular central portion 54 surrounded by a rim portion 55 which is molded about and bonded to the lower flange 52. The outer edge of the rim portion 55 extends into an outer wall portion 56 which is molded about and bonded onto an outer surface of the tubular shell 51. The outer wall portion 56 is shown as extending from the lower flange 52 to a point spaced from the open upper end of the tubular shell 51.

A plurality of grooves 57 are formed in the upwardly facing surface of the central portion 54. The grooves are formed in the manner similar to the grooves 22 and 42 of the previous embodiments. However, the inner ends of the grooves 57 are formed with wider groove portions 58 having additionally reduced thickness walls 59. The walls 59 are typically 0.03 to 0.10 millimeters in thickness to reduce the pressure required to rupture the grooves as the oil line tube is being inserted.

Figure 9:
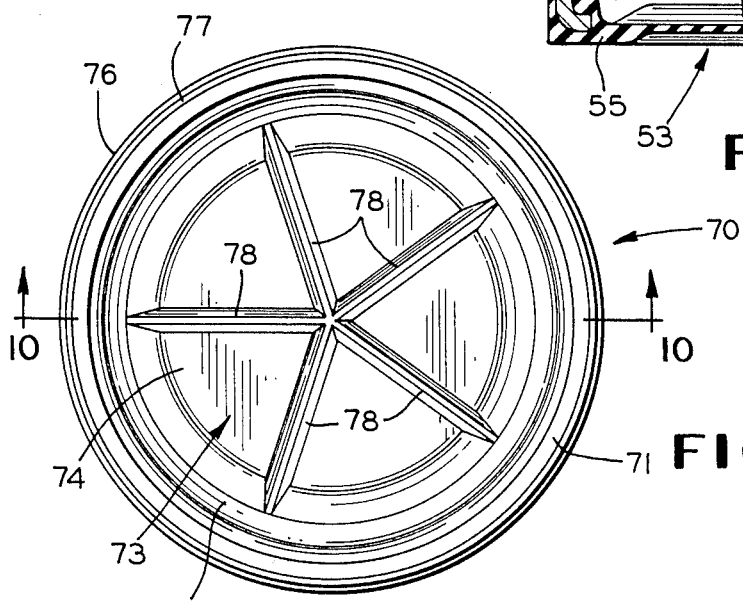
FIG. 9 is a plan view of a third alternate embodiment oil seal according to the present invention.
Figure 10:
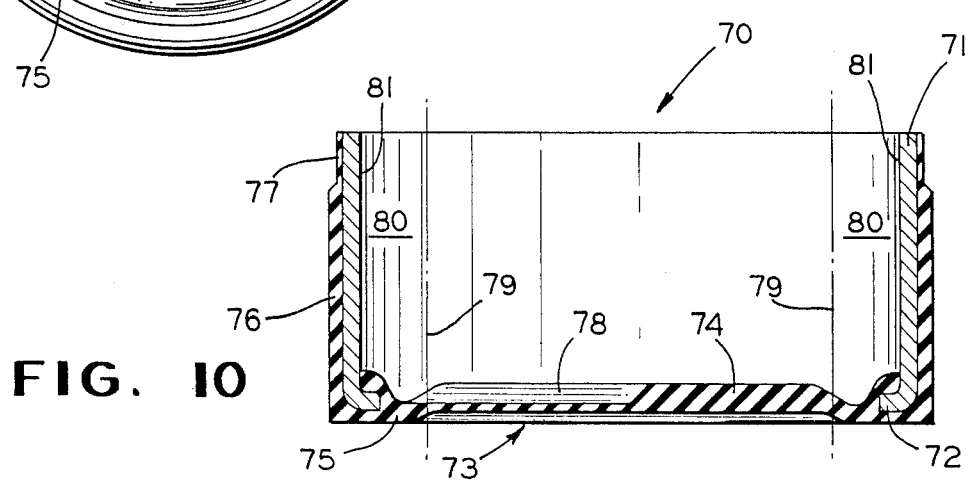
FIG. 10 is a cross-sectional view taken along the line 10—10 in FIG. 9.

There is shown in FIGS. 9 and 10, a third alternate embodiment of the puncturable oil seal assembly in accordance with the present invention. The seal assembly 70 has a tubular shell 71 with a generally radially inwardly extending lower flange 72 formed on a lower end thereof. A seal 73 has a generally circular central portion 74 surrounded by a rim portion 75 which is molded about and bonded to the lower flange 72. Extending from the rim portion 75 is a lower outer wall portion 76 which is molded about and bonded to an outer surface of the tubular shell 71. Extending upwardly from the lower outer wall portion 76 is an upper outer wall portion 77 which is molded about and bonded to an upper end of the upper outer surface of the tubular shell 71 such that the wall portions 76 and 77 completely enclose the outer surface of the tubular shell 71. A plurality of grooves 78, similar to the grooves 22 and 42, are formed in the upwardly facing surface of the central portion 74.

In operation, the seal assemblies 50 and 70 accept an oil line tube having an outer diameter approximately equal to the diameter of the circle defined by the outer ends of the grooves 57 and 78 such as shown in FIG. 10 with an oil line outer wall 79 shown in phantom. A space 80 is defined between the outer wall 79 and an inner wall 81 of the shell 71 for receiving the sections of the central portion 74 between the grooves 78 as such sections are bent inwardly by the oil line tube. The outer wall portion 56, shown in FIG. 7, and the lower outer wall portion 76, shown in FIG. 10, are utilized to avoid a grinding operation in the housing aperture which would be required for a press fit with the wall of the shell 51.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A seal assembly for an aperture formed in a housing of a vehicle engine, comprising:
   a tubular shell adapted to be retained in an aperture in a housing of a vehicle engine;
   a generally radially extending flange formed at one end of said shell; and
   a sealing membrane having a generally circular central portion encircled by a rim portion molded about and bonded to said flange, said central portion having at least one groove formed in a surface thereof for defining a reduced thickness wall at a bottom of said groove whereby when pressure is applied to said sealing membrane said reduced thickness wall tends to rupture prior to the rupture of any other portion of said sealing membrane.

2. The seal assembly according to claim 1 wherein said tubular shell is formed of a metallic material.

3. The seal assembly according to claim 1 wherein said sealing membrane is formed of an elastomeric material.

4. The seal assembly according to claim 3 wherein said elastomeric material is a nitrile rubber compound.

5. The seal assembly according to claim 3 wherein said elastomeric material has a durometer value of approximately seventy.

6. The seal assembly according to claim 1 wherein said reduced thickness wall is in the range of 0.20 to 0.31 millimeters thick.

7. The seal assembly according to claim 1 wherein said groove includes a first portion having a first predetermined wall thickness and a second portion having a second predetermined wall thickness less than the thickness of said first wall portion.

8. The seal assembly according to claim 7 wherein said first wall portion has a thickness of approximately 0.20 to 0.31 millimeters.

9. The seal assembly according to claim 8 wherein said second wall portion has a thickness of approximately 0.03 to 0.10 millimeters.

10. The seal assembly according to claim 1 wherein said groove has opposed side walls which are formed at a predetermined angle with respect to a plane perpendicular to said reduced said thickness wall.

11. The seal assembly according to claim 10 wherein said predetermined angle is approximately thirty degrees.

12. A puncturable seal assembly for sealing an aperture into which an oil line tube is to be inserted, the aperture being formed in a housing of a vehicle engine to provide access to a reservoir of oil, comprising:
- a tubular shell adapted to be retained in an aperture formed in a housing of a vehicle engine;
- a generally radially extending flange formed at one end of said shell defining an opening; and
- a sealing membrane for closing said opening and having a circular central portion attached to an annular rim portion, said rim portion being bonded to said flange, and including at least one groove formed in a surface of said central portion, said groove having a reduced thickness bottom wall which tends to rupture prior to the rupture of any other portion of said membrane when pressure is applied thereto.

13. The seal assembly according to claim 12 wherein said tubular shell includes a tubular outer shell having said radially extending flange formed as a first flange at one end thereof and having a second generally radially extending flange formed at an opposite end thereof, and further including an inner tubular shell retained between said first and second flanges.

14. The seal assembly according to claim 13 wherein said inner tubular shell has a generally radially inwardly extending flange formed adjacent said second flange of said outer tubular shell.

15. The seal assembly according to claim 13 wherein an inner peripheral portion of said first flange is angled toward an opening defined by an inner peripheral portion of said second flange.

16. The seal assembly according to claim 12 including five grooves formed in said surface of said central portion, said grooves extending from a center of said central portion to said rim portion.

17. The seal assembly according to claim 12 wherein said groove includes a first portion having a first predetermined thickness bottom wall and a second portion having a second predetermined thickness bottom wall of less thickness than said first bottom wall portion.

18. A puncturable seal assembly for sealing an aperture adapted to retain an oil line tube, the aperture being formed in a vehicle engine to provide access to a reservoir for oil, comprising:
- a tubular shell adapted to be retained in an aperture formed in a housing of a vehicle engine;
- a generally radially inwardly extending flange formed at one end of said shell and defining an opening; and
- a sealing membrane for closing said opening, said membrane having a generally circular central portion attached to an annular rim portion, said rim portion being bonded to said flange, and a plurality of grooves formed in a surface of said central portion extending radially outwardly from a center of said central portion, each of said grooves defining a reduced thickness bottom wall of said central portion.

19. The seal assembly according to claim 18 wherein said rim portion of said sealing membrane extends along at least a portion of an outer surface of said tubular shell and is bonded thereto.

20. The seal assembly according to claim 18 wherein each of said grooves includes a first portion adjacent said rim portion having a first predetermined thickness bottom wall and a second portion adjacent said center of said central portion having a second predetermined thickness bottom wall, said second portion bottom wall being less thick than said first portion bottom wall.

* * * * *